United States Patent
Chang et al.

(10) Patent No.: US 10,146,716 B2
(45) Date of Patent: Dec. 4, 2018

(54) METHOD FOR USING SHARED DEVICE AND RESOURCE SHARING SYSTEM

(71) Applicant: Wistron Corporation, New Taipei (TW)

(72) Inventors: Min-Chien Chang, New Taipei (TW); Chih-Yuan Hung, New Taipei (TW)

(73) Assignee: Wiwynn Corporation, New Taipei (TW)

(*) Notice: Subject to any disclaimer, the term of this patent is extended or adjusted under 35 U.S.C. 154(b) by 240 days.

(21) Appl. No.: 15/169,756

(22) Filed: Jun. 1, 2016

(65) Prior Publication Data
US 2017/0185552 A1   Jun. 29, 2017

(30) Foreign Application Priority Data
Dec. 28, 2015 (TW) .............................. 104144097 A

(51) Int. Cl.
  *G06F 13/374* (2006.01)
  *G06F 13/364* (2006.01)
  *G06F 13/40* (2006.01)

(52) U.S. Cl.
  CPC .......... *G06F 13/374* (2013.01); *G06F 13/364* (2013.01); *G06F 13/4031* (2013.01)

(58) Field of Classification Search
  CPC ... G06F 13/374; G06F 13/364; G06F 13/4031
  See application file for complete search history.

(56) References Cited

U.S. PATENT DOCUMENTS

| 5,365,228 | A  | * | 11/1994 | Childs  | G06F 13/4022 340/2.21 |
| 6,157,989 | A  | * | 12/2000 | Collins | G06F 13/18 710/116 |
| 6,185,647 | B1 | * | 2/2001  | Shibuya | G06F 13/362 710/107 |
| 9,064,050 | B2 |   | 6/2015  | Duroiu et al. | |
| 2005/0177633 | A1 | * | 8/2005 | Plunkett | B41J 2/04505 709/225 |

FOREIGN PATENT DOCUMENTS

TW   201345211   11/2013

OTHER PUBLICATIONS

"Office Action of Taiwan Counterpart Application," dated Jan. 6, 2017, with English translation thereof, p. 1-p. 4, in which the listed references were cited.

* cited by examiner

*Primary Examiner* — Henry Tsai
*Assistant Examiner* — John B Roche
(74) *Attorney, Agent, or Firm* — Winston Hsu

(57) ABSTRACT

A method for using a shared device and a resource sharing system are provided. An arbitrator node sets an initial weight of each of processors based on identification information. The arbitrator node calculates a priority score for each processor based on an initial weight of each of the processors and state diagnostic codes recorded by each processor to establish a priority sequence. When the arbitrator node simultaneously receives a request for requesting an access right of the shared device transmitted by each of two or more processors, the arbitrator node determines one of the processors having the access right of the shared device based on the priority sequence.

22 Claims, 7 Drawing Sheets

METHOD FOR USING SHARED DEVICE AND RESOURCE SHARING SYSTEM

CROSS-REFERENCE TO RELATED APPLICATION

This application claims the priority benefit of Taiwan application serial no. 104144097, filed on Dec. 28, 2015. The entirety of the above-mentioned patent application is hereby incorporated by reference herein and made a part of this specification.

BACKGROUND OF THE INVENTION

1. Field of the Invention

The invention relates to a resource sharing mechanism, and more particularly, to a method for using shared device and a resource sharing system using the method which are capable of preventing the race condition.

2. Description of Related Art

Generally, when a resource is simultaneously accessed by two or more processors, a situation known as the race condition will occur to cause incomplete data or synchronization failure. The probability for such problem to arise would be relatively increased especially when there are more processors or larger amount of data. Therefore, a transmission protect mechanism is required to prevent occurrence of said problem. The arbitrator mechanism is one of the methods widely applied for solving such problem.

In the arbitrator mechanism, one processor usually serves as an arbitrator for granting an access mark, and the processor that owns the access mark have the right to access the shared resource. The arbitrator can set up an access schedule according to a request sequence of the processors, so that the occurrence of the race condition may be prevented according to a priority sequence. Nonetheless, the existing arbitrator mechanism has the following disadvantages.

(1) The arbitrator is lack of monitoring mechanism since only the processor end and the storage device end are monitored. (2) The priority sequence cannot be dynamically adjusted in response to the different processors. That is to say, because it is impossible for internal settings and firmware used by the processors to be completely identical while the access behavior for the storage devices are not the same either, the priority sequence cannot be measured by using the same determination standard for each of the processors. (3) In the case where the original arbitrator is incapacitated or shut down, a replacement can only be conducted according to a predefined sequence. As such, with the lack of monitoring mechanism for the arbitrator and the condition where the sequence cannot be dynamically adjusted, it is difficult to guarantee that one stable and suitable new arbitrator may be selected. If transmission efficiency is still poor and causes frequency crashes after the new arbitrator is selected, the entire system architecture will seem unstable and prone to troubles. Worth yet, because the arbitrator may need to be replaced again, the arbitrator architecture may waste too much time in replacement of the arbitrator which leads to inefficiency.

SUMMARY OF THE INVENTION

The invention is directed to a method for using shared device and a resource sharing system using the same, which are capable of solving the race condition due to the shared device being accessed by multiple processors.

The method for using the shared device of the invention includes: establishing a priority sequence by an arbitrator node, and when the arbitrator node simultaneously receives a request for requesting an access right of a shared device transmitted by each of two or more processors, determining one of the processors as having the access right of the shared device based on the priority sequence. Herein, the shared device is provided for a plurality of processors and one of the processors is used to serve as the arbitrator node. Aforesaid step of establishing the priority sequence by the arbitrator node includes: setting an initial weight of each of the processors based on identification information of each of the processors; obtaining state diagnostic information of each of the processors, wherein the state diagnostic information indicates a transmission state of each of the processors to the arbitrator node and the shared device, the state diagnostic information comprises one or more state diagnostic codes, and each of the state diagnostic codes is corresponding to a state weight; and calculating a priority score for each of the processors to establish the priority sequence based on the initial weight corresponding to each of the processors and the state weights corresponding to the one or more state diagnostic codes included by each of the processors.

The resource sharing system of the invention includes a plurality of processors and a shared device. The shared device is coupled to the processors and provided for the processors to use. One of the processors serves as an arbitrator node, and a priority sequence is established by the arbitrator node. An initial weight of each of the processors is set based on identification information of each of the processors. State diagnostic information of each of the processors is obtained. The state diagnostic information indicates a transmission state of each of the processors to the arbitrator node and the shared device, the state diagnostic information includes one or more state diagnostic codes, and each of the state diagnostic codes is corresponding to a state weight. A priority score is calculated for each of the processors to establish the priority sequence based on the initial weight corresponding to each of the processors and the state weights corresponding to the one or more state diagnostic codes included by each of the processors. Further, when the arbitrator node simultaneously receives a request for requesting an access right of a shared device transmitted by each of two or more processors, one of the processors is determined as having the access right of the shared device based on the priority sequence.

Based on the above, the transmission state of each of the processors to the arbitrator node and the shared device is utilized together with the characteristic of each of the processors in order to determine the priority sequence. Accordingly, a suitable determination may be given on basis of the different processors to provide the priority sequence that is suitable resource sharing system. As a result, the incomplete data caused by the race condition due to accessing by multiple processors may be prevented and the problems related to the access efficiency and priority issue in the replacement may also be solved.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
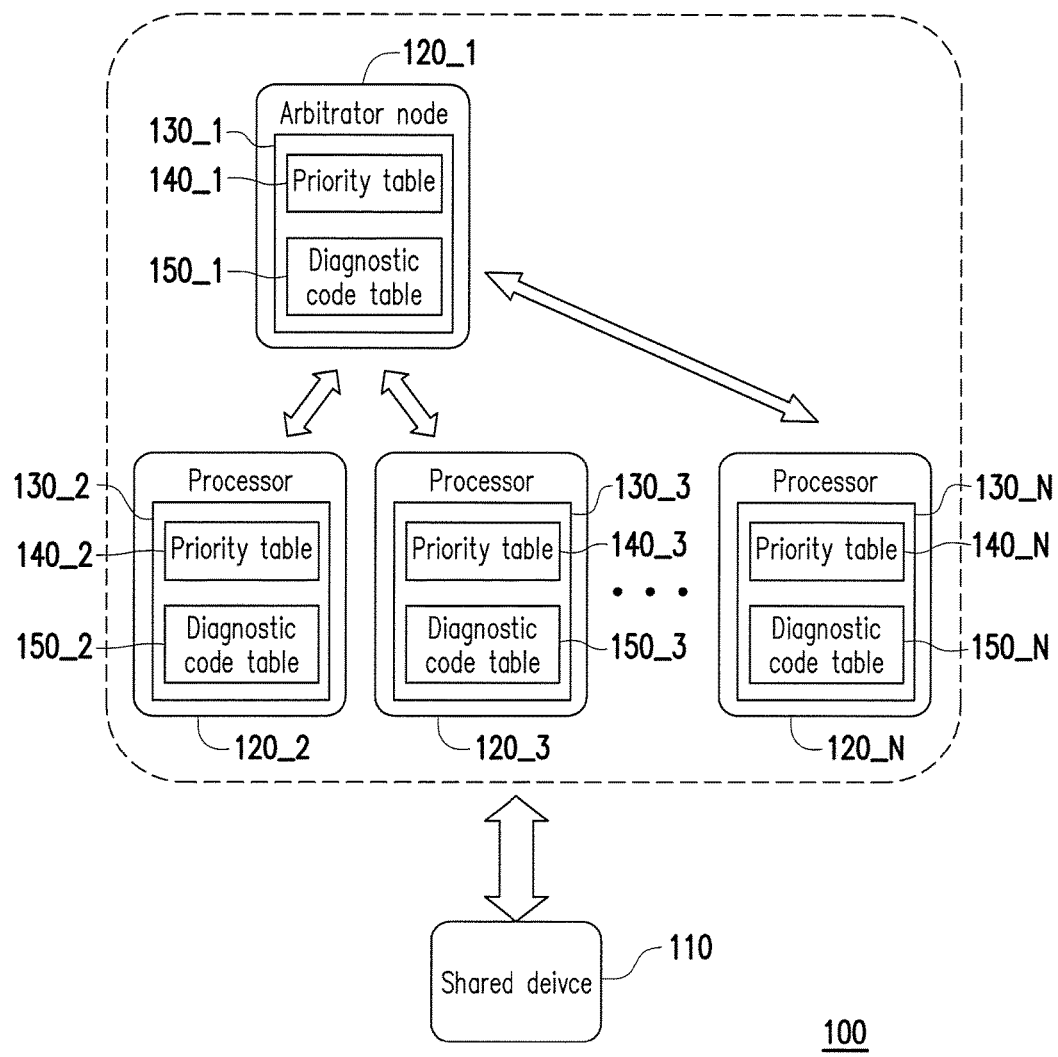
FIG. 1 is a block diagram of a resource sharing system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a resource sharing system according to an embodiment of the invention. Referring to FIG. 1, a resource sharing system 100 includes a shared device 110 and a plurality of processors 120_1 to 120_N and the shared device 110 is provided for allowing all the processors 120_1 to 120_N to access. In this embodiment, for illustrative convenience, only one shared device 110 is illustrated. In other embodiments, the resource sharing system 100 can include a plurality of different or identical shared devices 110.

The resource sharing system 100 may be a host, and may also be a server system composed of multiple hosts. Further, aforesaid processors 120_1 to 120_N are not limited only to be disposed within the same host. The processors 120_1 to 120_N disposed in different hosts may communicate with each other in a wired or wireless transmission manner.

The processors 120_1 to 120_N are, for example, central processing unit (CPU), graphic processing unit (GPU), physics processing unit (PPU), microprocessor, embedded control chip, digital signal processor (DSP), application specific integrated circuits (ASIC) or other similar devices. The shared device 110 may be an electronic device (e.g., server, etc.) having a storage device or a mobile storage device (e.g., Universal Serial Bus (USB) drive, etc.) as well as a detachable storage device and the like. The storage device may be, for example, a non-volatile memory, a random access memory (RAM) or a hard disk. The non-volatile memory is, for example, an electrically erasable programmable read only memory (EEPROM).

The resource sharing system 100 has an arbitrator mechanism, that is, one of aforesaid processors 120_1 to 120_N being set to serve as an arbitrator node. In this embodiment, the processor 120_1 serves as the arbitrator node. The arbitrator node 120_1 grants an access mark of the shared device 110 to one of the processors 120_2 to 120_N. The processor that owns the access mark has an access right of the shared device 110.

The processors 120_1 to 120_N respectively include corresponding storage spaces 130_1 to 130_N for storing priority tables 140_1 to 140_N (where a priority sequence is recorded) and diagnostic code tables 150_1 to 150_N (where state diagnostic information is recorded), respectively. After being established by the arbitrator node 120_1, the priority table 140_1 synchronizes with the priority tables 140_2 to 140_N of the processors 120_2 to 120_N.

The processors 120_1 to 120_N may connect to each other by any method (e.g., through I2C (Inter-Integrated Circuit) bus), and may also transmit desired information to each other. For example, the state diagnostic information and the priority sequence are both transmitted by aforesaid connection method.

Other than transmitting data with the shared device 110, each of the processors 120_2 to 120_N (excluding the arbitrator node 120_1) merely requests for the access right with the arbitrator node 120_1. Therefore, in each of the diagnostic code tables 150_2 to 150_N stored by the processors 120_2 to 120_N, only a transmission state of the respective processor to the arbitrator node 120_1 and the shared device 110 is recorded.

In addition, the arbitrator node 120_1 not only records its transmission state to the processors, but also further archives diagnostic code information reported from all the processors 120_2 to 120_N into the diagnostic code table 150_1. Therefore, the diagnostic code table 150_1 is recorded with the transmission state of the arbitrator node 120_1 and all the processors 120_2 to 120_N.

Each of the diagnostic code tables 150_2 to 150_N indicates the transmission state of the respective processor to the arbitrator node 120_1 and the shared device 110. Each of the diagnostic code tables 150_2 to 150_N includes one or more state diagnostic codes, and each of the state diagnostic codes is corresponding to one transmission state.

The state diagnostic code is defined based on transmission efficiency, and includes various transmission states possibly encountered during transmission. For example, packets transmitted by the arbitrator node 120_1 (the arbitrator end), the processors 120_2 to 120_N (the processor end) and the shared device 110 (the device end) all include the state diagnostic codes. The arbitrator end and the processor end will both record the state diagnostic codes being received. The possibly encountered transmission states are described below with reference to various examples.

The state diagnostic code "0x00" indicates "transmission success". The state diagnostic code "0x01" indicates "pending". That is, the transmission is still executing and waiting for the shared device 110 to respond. For example, it indicates that the shared device 110 may still perform the transmission and the access right is not yet released. The state diagnostic code "0x02" indicates "not available". That is, the arbitrator node 120_1 does not respond yet, or the transmission cannot be performed due to channels for the transmission with the shared device 110 being occupied. The reasons for such condition to occur may include that the access right is not correctly released by the arbitrator node 120_1, or the channel is still occupied by the previous processor that owns the access right.

The state diagnostic code "0x05" indicates "illegal channel". That is, the connection for the transmission with the shared device 110 cannot be established, or the channels for connecting with the shared device 110 cannot be found. For example, due to blockages or damages on hardware circuits, the channels for accessing the device cannot be found after the access right of the shared device 110 is obtained by one of the processors. The state diagnostic code "0x0A" indicates "timeout", which means that the processor that owns the access right of the shared device 110 fails to complete the transmission and return the access right to the arbitrator node 120_1 within a preset time.

The state diagnostic code "0x10" indicates "cyclic redundancy check (CRC) error", which means that a CRC check for the transmitted packets fails. The state diagnostic code "0x11" indicates "Negative Acknowledgement (NAK)". That is, the arbitrator node 120_1 does not receive a response from the processor that owns the access right of the shared device 110 within a preset time, which means that such processor appears to be abnormal so that the access right cannot be correctly released.

The state diagnostic code "0x1F" indicates "Identification", which means that the arbitrator node 120_1 confirms an identity of each of the processors 120_2 to 120_N. Because the processors 120_2 to 120_N are not necessarily the same while a firmware version, a number of processor cores, a processor clock, a processor type and a processor usage among them may also be different, it is required for the arbitrator node 120_1 to confirm the identity of each of the processors 120_2 to 120_N.

For the entire resource sharing system 100, regardless of whether it is the arbitrator end, the processor end or the device end, the transmission may fail due to processing problem of their own. Therefore, the transmission state of each end must be monitored at any time and the corresponding state diagnostic codes must be recorded by the connection state diagnosis.

Figure 2A:
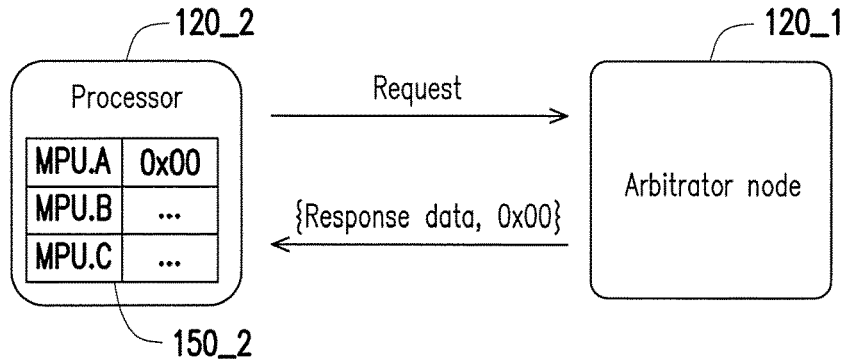
FIG. 2A to FIG. 2D are schematic diagrams of a connection state diagnosis according to an embodiment of the invention.
Figure 2B:
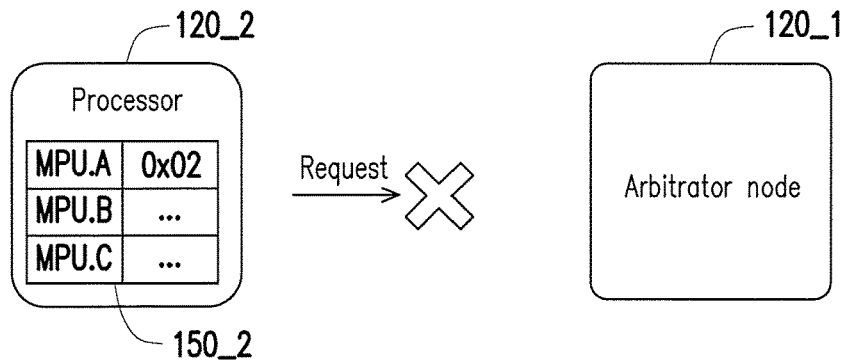
Figure 2C:
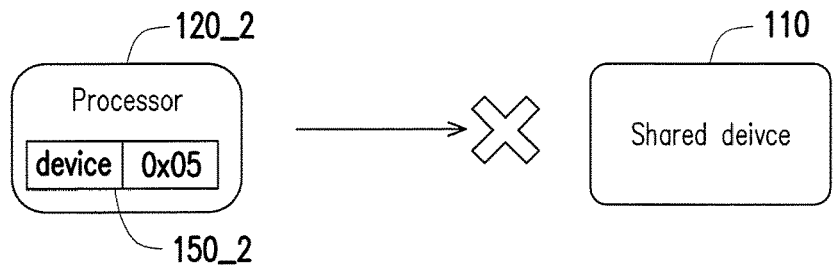
Figure 2D:
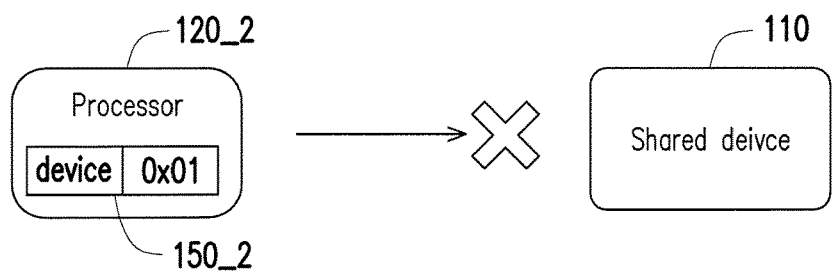

FIG. 2A to FIG. 2D are schematic diagrams of a connection state diagnosis according to an embodiment of the invention. In this embodiment, the description is provided with reference to the processor 120_2, and the other processors may also adopt the same method. FIG. 2A and FIG. 2B show an example of the transmission between the processor 120_2 and the arbitrator node 120_1, and FIG. 2C and FIG. 2D show an example of the transmission between the processor 120_2 and the shared device 110. Herein, the transmission states as mentioned in the descriptions for FIG. 2A to FIG. 2D are merely examples, but the invention is not limited thereto.

In FIG. 2A, the processor 120_2 transmits a request to the arbitrator node 120_1. After the request is received, the arbitrator node 120_1 transmits response data and the state diagnostic code "0x00" indicating "transmission success" back to the processor 120_2. For example, it is assumed that the processor 120_2 transmits the request for requesting the access right of the shared device 110 to the arbitrator node 120_1, and the state diagnostic code received by the processor 120_2 is "0x00" which indicates "transmission success". Meanwhile, the processor 120_2 records the state diagnostic code "0x00" into the diagnostic code table 150_2. For example, if a processor code name of the arbitrator node 120_1 is "MPU.A", "0x00" is then recorded into the field corresponding to "MPU.A".

Referring to FIG. 2B, after the request is transmitted to the arbitrator node 120_1 by the processor 120_2, if the processor 120_2 does not receive a response from the arbitrator node 120_1 within a set time, the processor 120_2 generates the state diagnostic code "0x02" (not available) by itself and records "0x02" into the diagnostic code table 150_2. Further, after the request for requesting the access right of the shared device 110 is transmitted to the arbitrator node 120_1 by the processor 120_2, if the shared device 110 is currently used by the other processor, the arbitrator node 120_1 transmits the state diagnostic code "0x02" (not available) back to the processor 120_2 so that the processor 120_2 can record "0x02" into the diagnostic code table 150_2.

In FIG. 2C, when the processor 120_2 performs the transmission with the shared device 110 after obtaining the access right of the shared device 110, if the processor 120_2 cannot find any channel for connecting to the shared device 110, the processor 120_2 can generate the state diagnostic code "0x05" to be recorded into the diagnostic code table 150_2.

In FIG. 2D, when the processor 120_2 performs the transmission with the shared device 110 after obtaining the access right of the shared device 110, if the connection channel functions normally but the processor 120_2 cannot receive any response from the shared device 110, the processor 120_2 can determine that the current state is the pending state and generate the state diagnostic code "0x01" to be recorded into the diagnostic code table 150_2.

With the connection state diagnosis as describe above, the transmission state of the processor end to the arbitrator end and the shared device end may be monitored through the defined state diagnostic codes. Further, multiple state diagnostic codes rather than one may be transmitted at a time.

In addition, when the processor end starts the transmission with the shared device 110 after obtaining the access right, the arbitrator end can monitor a use state of the processor end. For example, whether the return of the access right from the processor end is overdue or whether the processor end is abnormal may be checked. Take the processor 120_2 (which has obtained the access right) for example, after finding that the return of the access right from the processor 120_2 is overdue, the arbitrator node 120_1 can record one state diagnostic code "0x0A" into the field corresponding to the processor 120_2 in the state diagnostic code 150_1. Thereafter, the arbitrator node 120_1 transmits the request to confirm whether the processor 120_2 is operating normally. If it is found that the processor 120_2 is not operating normally, the arbitrator node 120_1 can record another state diagnostic code "0x11" into the field corresponding to the processor 120_2 in the diagnostic code table 150_1 and forcibly release the access right.

After archiving all the state diagnostic codes of itself and the processor end, the arbitrator node 120_1 can further determine the priority sequence so that an optimal selection and a most efficient method may be provided based on the priority sequence when the race condition occurs or when the replacement of the arbitrator is required. Each step in the method for using the shared device 110 is described below with reference to the resource sharing system 100.

Figure 3:
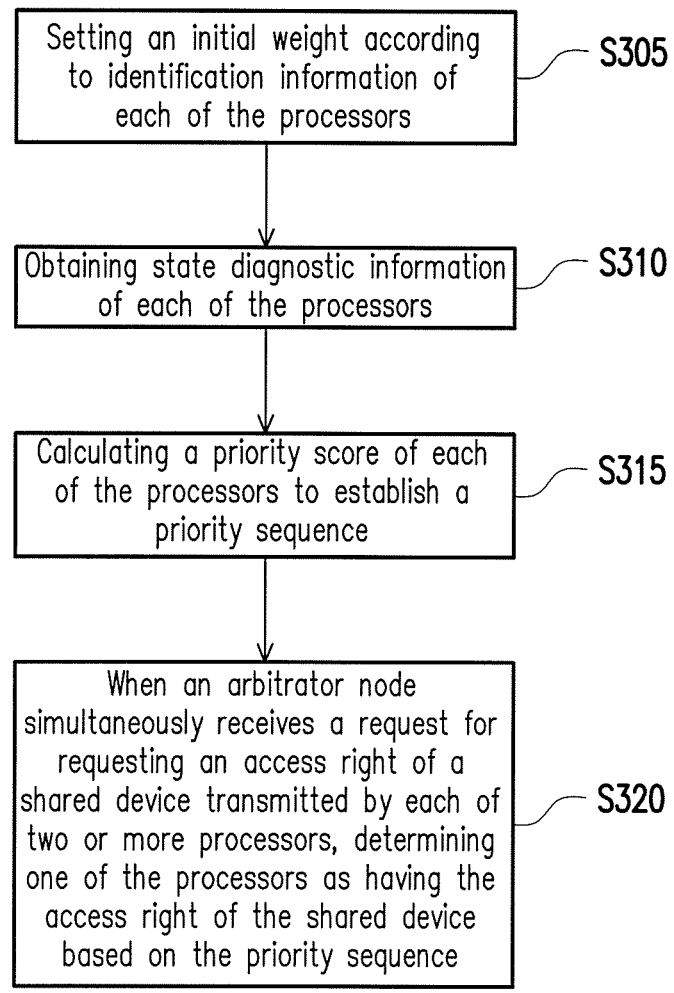
FIG. 3 is a flowchart of a method for using shared device according to an embodiment of the invention.

FIG. 3 is a flowchart of a method for using shared device according to an embodiment of the invention. Referring to FIG. 3, in steps S305 to S315, a priority sequence is established by the arbitrator node 120_1. Specifically, in step S305, the arbitrator node 120_1 sets an initial weight according to identification information of each of the processors 120_1 to 120_N. For example, the processors (including the arbitrator node) 120_1 to 120_N are grouped into a plurality of groups based on the identification information of each of the processors 120_1 to 120_N and the initial weight of each of the groups is set.

In the architecture of the resource sharing system 100, each of the processors has a different usage. Some of the processors are dedicated to process computation while some of the processors are simply responsible for storing less important data. Therefore, each of the processors will have different priorities for requesting the access right. Therefore, with the grouping method, the processors that need to be processed earlier are assigned to a group with high priority (e.g., indicated by group numbers), whereas the processors that process less urgent tasks or has lower requirements are assigned to a group with low priority. Then, each of the group numbers is converted into one initial weight, as shown in Table 1.

TABLE 1

| Group number | Initial weight |
| --- | --- |
| 1 | 100 |
| 2 | 95 |
| 3 | 90 |
| 4 | 85 |
| 5 | 80 |
| ... | ... |

The initial weights of the groups corresponding to the processor end may be different due to different characteristics of the processors. For example, there is a higher possibility for the delays or the CRC error to occur in some of the processors due to greater data transmission amount. Accordingly, the initial weights in the group of such processors may be reduced at the stage in which the initial weights are pre-defined. It aims to allow said architecture to provide suitable determination reference for the different processors, so that the priority sequence suitable for the entire architecture may be generated.

The arbitrator node 120_1 transmits an inquiry message including the state diagnostic code "0x1F" to all the processors 120_2 to 120_N, and the processors 120_2 to 120_N transmit their own identification information back to the arbitrator node 120_1 after receiving the inquiry message. Herein, the identification information is, for example, at least one of a firmware version, a processor number, a processor internal setting, a number of processor cores, a processor clock, a processor type and a processor usage or a combination thereof. The arbitrator node 120_1 then finds the group number to which each of the processors (including the arbitrator node) belongs with reference to the defined corresponding table (Table 2) and records a result thereof. The corresponding table shown by Table 2 takes the firmware version as an example. The group number 1 is corresponding to the firmware version "25.01.XX", and the group number 2 is corresponding to the firmware version "23.02.XX".

TABLE 2

| Group number | Firmware version |
| --- | --- |
| 1 | 25.01.XX |
| 2 | 23.02.XX |
| ... | ... |
| N | Other |

Next, in step S310, the arbitrator node 120_1 obtains the state diagnostic information of each of the processors (including the arbitrator node 120_1, the processors 120_2 to 120_N and the shared device 110), and grants each of the state diagnostic codes one corresponding state weight, as shown in Table 3.

Because each transmission from the processor end to the shared device 110 includes the state diagnostic code, the arbitrator end can archive the state diagnostic code of the processor end at any time to serve as reference for updating the priority table or replacing the arbitrator end. The state diagnostic code may be used to measure transmission efficiency for the processor end, the arbitrator end and the device end.

TABLE 3

| State diagnostic code | State weight |
| --- | --- |
| 0x00 | 0.0 |
| 0x01 | 0.1 |
| 0x02 | 0.2 |
| 0x03 | 0.3 |
| 0x04 | 0.4 |
| ... | ... |
| 0xFF | 0.9 |

Figure 4:
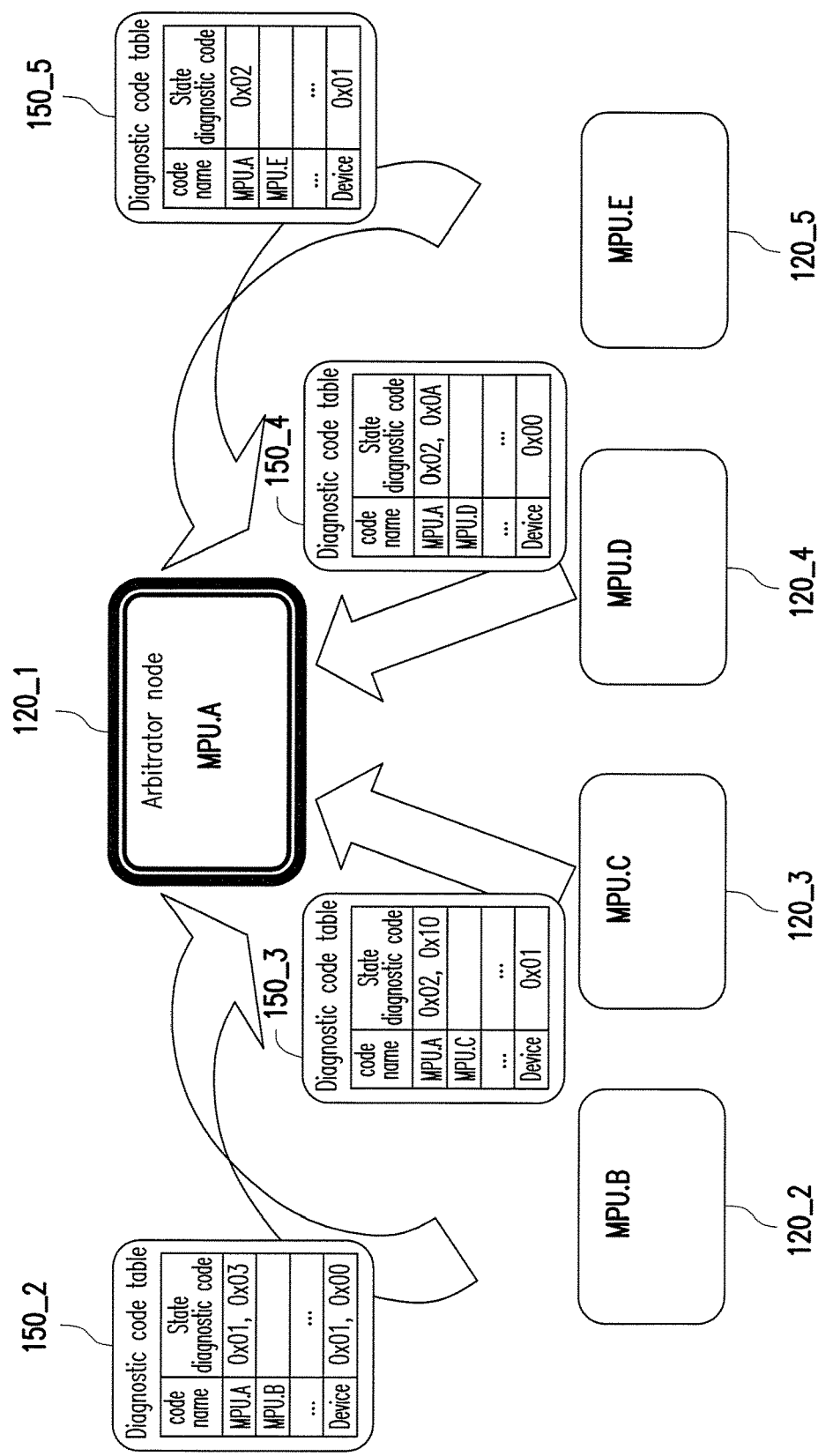
FIG. 4 is a schematic diagram for archiving the state diagnostic information according to an embodiment of the invention.

For example, the arbitrator node 120_1 regularly receives the state diagnostic information recorded from each of the processors 120_2 to 120_N. For instance, FIG. 4 is a schematic diagram for archiving the state diagnostic information according to an embodiment of the invention. Referring to FIG. 4, in the present embodiment, the processor code name of the arbitrator node 120_1 is "MPU.A". Further, for illustrative convenience, only the processors 120_2 to 120_5 are illustrated, and the processor code names of these processors are "MPU.B", "MPU.C", "MPU.D" and "MPU.E", respectively.

Among the diagnostic code tables 150_2 to 150_5, the field corresponding to the code name "MPU.A" is configured to record the state diagnostic code obtained during the transmission of the respective one of the processors 120_2 to 120_5 to the arbitrator node 120_1; and the field corresponding to the code name "Device" is configured to record the state diagnostic codes obtained during the transmission of the respective one of the processors 120_2 to 120_5 to the shared device 110.

The arbitrator node 120_1 archives each of the obtained diagnostic code tables 150_1 to 150_N of the processors 120_1 to 120_N so that Table 4 is obtained. Table 4 shows the diagnostic code table 150_1 of the arbitrator node 120_1. In Table 4, taking the diagnostic code table 150_2 as an example, the state diagnostic codes "0x01" and "0x03" obtained during the transmission between the processor 120_2 and the arbitrator node 120_1 are recorded into the field corresponding to the processor code name "MPU.B" (corresponding to the processor 120_2) in the diagnostic code table 150_1. By analogy, the state diagnostic codes related to the arbitrator node 120_1 (with the code name being "MPU.A") in other state diagnostic information are recorded into the corresponding field in the diagnostic code table 150_1.

Further, because the shared device 110 cannot transmit the state diagnostic code by itself due to lack of any determination capability. Therefore, the transmission is conducted by each of the processors and the shared device 110, and the corresponding state diagnostic codes are generated based on the transmission state by each of the processors. That is to say, the state diagnostic codes recorded in the fields corresponding to the code name "Device" among the diagnostic code tables 150_2 to 150_N indicates the states of the shared device 110. Therefore, the state diagnostic codes recorded in the fields corresponding to the code name "Device" among the diagnostic code tables 150_2 to 150_N are recorded into the field corresponding to the code name "Device" in Table 4.

TABLE 4

| Code name | State diagnostic code |
| --- | --- |
| MPU.A | 0x00 |
| MPU.B | 0x01, 0x03 |

TABLE 4-continued

| Code name | State diagnostic code |
|---|---|
| MPU.C | 0x02, 0x10 |
| MPU.D | 0x02, 0x0A |
| MPU.E | 0x02 |
| ... | ... |
| MPU.Y | 0x02, 0x03, 0x04, 0x0D |
| Device | 0x00, 0x01 |

After Table 4 is obtained, in step S315, the arbitrator node 120_1 calculates a priority score of each of the processors 120_1 to 120_N to establish a priority sequence. That is, the priority score is calculated one by one for each of the processors in order to establish the priority sequence based on the initial weight of the group corresponding to the processor and the included state weights of the state diagnostic codes. The priority score of each of the processors is calculated according an equation below:

$$priority\_W = ini\_W \times (1 + state\_total\_W)$$

Herein, priority_W represents the priority score of the processor, ini_W represents the initial weight of the processor, and state_total_W represents a sum of all the state weights included by the processor. The arbitrator node 120_1 collects all the state diagnostic codes from the processor end and utilizes the state weights corresponding to the state diagnostic codes and the initial weight of the processor end to calculate the priority score.

For example, the processor 120_2 has the code name being "MPU.B" and a group number being 2. According to Table 3, the initial weight of the group number 2 is 95. According to Table 4, the processor 120_2 includes the state diagnostic codes "0x01" and "0x03", and thus it can be known that the state weights thereof are 0.1 and 0.3 according to Table 3. By substituting the initial weight 95 and the state weights 0.1 and 0.3 into the aforementioned equation, the priority score 133 of the processor 120_2 may then be obtained (i.e., 95×(1+(0.1+0.3))=133). By analogy, the arbitrator node 120_1 can calculate the priority score of each of the processors and establish the priority sequence accordingly, so as to obtain the priority table 140_1 (Table 5).

In Table 5, the priority score being lower indicates that the priority sequence of the corresponding processor is higher; the priority score being higher indicates that the priority sequence of the corresponding processor is lower. Thereafter, the arbitrator node 120_1 synchronizes the priority table 140_1 to each of the processors.

TABLE 5

| Priority sequence | Processor code name | Priority score |
|---|---|---|
| 1 | MPU.A | 100 |
| 2 | MPU.T | 110 |
| 3 | MPU.G | 120 |
| 4 | MPU.B | 133 |
| 5 | MPU.Z | 177 |
| 6 | MPU.C | 190 |
| ... | ... | |
| N | MPU.H | 245 |
| N + 1 | MPU.Y | 255 |

Thereafter, in step S320, when the arbitrator node 120_1 simultaneously receives a request for requesting an access right of the shared device 110 transmitted by each of two or more of the processors, one of the processors with high priority is determined as having the access right of the shared device 110 based on the priority sequence. In the example of the processor code names "MPU.T" and "MPU.B" in Table 5, the access right of the shared device 110 will be obtained by the processor with the processor code name "MPU.T".

Another example is provided below as reference to describe the connection state diagnosis in more details.

Figure 5:
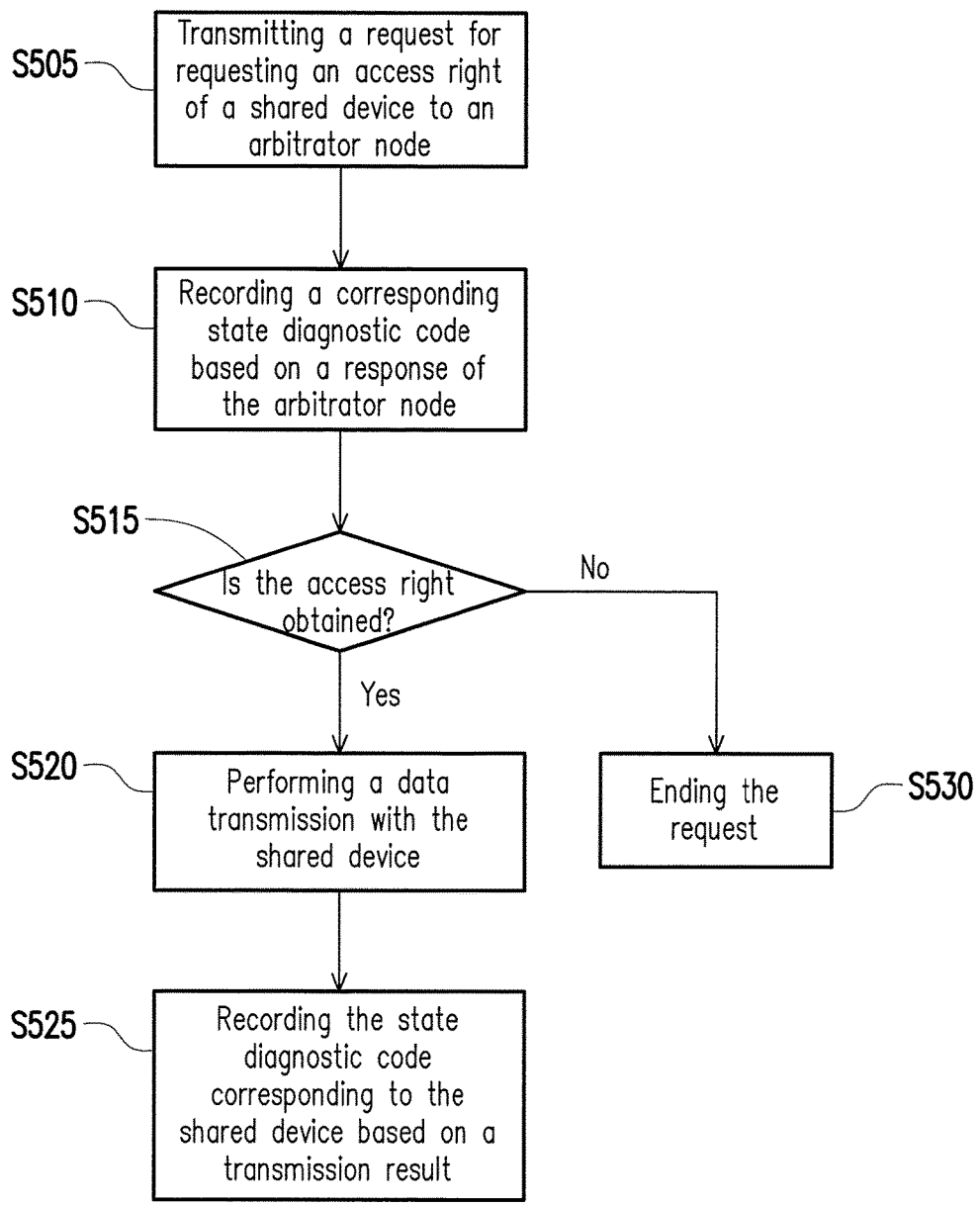
FIG. 5 is a flowchart of a connection state diagnosis at the processor end according to an embodiment of the invention.

FIG. 5 is a flowchart of a connection state diagnosis at the processor end according to an embodiment of the invention. In this embodiment, an example is given in which the processor 120_2 intends to use the shared device 110. In step S505, the processor 120_2 transmits the request for requesting the access right of the shared device 110 to the arbitrator node 120_1. Next, in step S510, the processor 120_2 records a corresponding state diagnostic code based on a response of the arbitrator node 120_1.

In step S515, the processor 120_2 determines whether the access right is obtained according to the response of the arbitrator node 120_1. If the access right is obtained by the processor 120_2, in step S520, the processor 120_2 can start to perform a data transmission with the shared device 110. Next, in step S525, the processor 120_2 records the state diagnostic code corresponding to the shared device 110 based on a transmission result. If the access right is not obtained by the processor 120_2, the request is ended as shown by step S530.

Step S505 and step S510 are the connection state diagnosis between the processor 120_2 and the arbitrator node 120_1, which may refer to the description for both FIG. 2A and FIG. 2B. Step S520 and step S525 performed after the access right is obtained by the processor 120_2 are the connection state diagnosis between the processor 120_2 and the shared device 110, which may refer to the description for both FIG. 2C and FIG. 2D.

Figure 6:
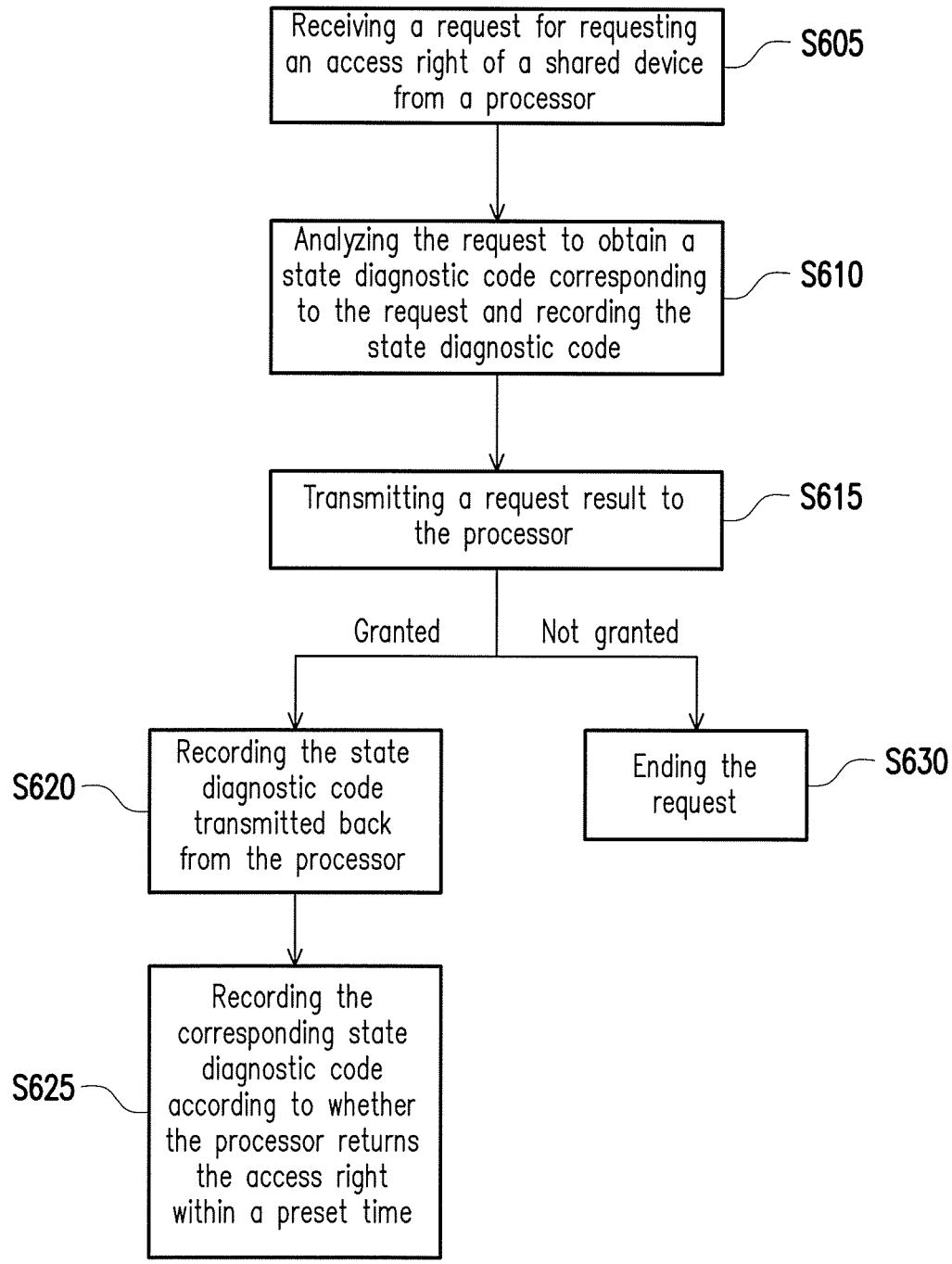
FIG. 6 is a flowchart of a connection state diagnosis at the arbitrator end according to an embodiment of the invention.

FIG. 6 is a flowchart of a connection state diagnosis at the arbitrator end according to an embodiment of the invention. In this embodiment, an example is given in which the processor 120_2 intends to use the shared device 110. In step S605, the arbitrator node 120_1 receives a request for requesting an access right of the shared device 110 from the processor 120_2. Next, in step S610, the arbitrator node 120_1 analyzes the request to obtain a state diagnostic code corresponding to the request and records the state diagnostic code. For example, because the arbitrator node 120_1 can receive the request transmitted by the processor 120_2, in the field corresponding to the processor 120_2 in the diagnostic code table 150_1, the state diagnostic code "0x00" is recorded to indicate "transmission success".

Thereafter, in step S615, the arbitrator node 120_1 transmits a request result to the processor 120_2. In the case where only the processor 120_2 transmits the request, after confirming that the access right of the shared device 110 is released, the arbitrator node 120_1 transmits the response which grants the access right of the shared device 110 and the state diagnostic code "0x00" (which indicates "transmission success") to the processor 120_2. On the other hand, after confirming that the access right of the shared device 110 is not yet released, the arbitrator node 120_1 transmits the response which does not grant the access right of the shared device 110 and the state diagnostic code "0x00" to the processor 120_2.

Further, in step S610, if the arbitrator node 120_1 determines that there is CRC error in the request after analyzing the request transmitted by the processor 120_2, the arbitrator node 120_1 further records the state diagnostic code "0x10" (which indicates "CRC error") and "0x00" (which indicates "transmission success") into the field corresponding to the processor 120_2 in the diagnostic code table 150_1. Further, in step S615, the arbitrator node 120_1 simultaneously transmits the state diagnostic codes "0x10" and "0x00" to the processor 120_2. In view of the above, it can be known that multiple state diagnostic codes rather than one may be transmitted at a time.

In addition, in the case where there are other processors that transmit the request at the same time when the processor 120_2 does, the arbitrator node 120_1 determines which one of the processors can obtain the access right of the shared device 110 according to the priority sequence recorded in the priority table 140_1.

In the case where the processor 120_2 is granted with the access right of the shared device 110, in step S620, the arbitrator node 120_1 records the state diagnostic code transmitted back from the processor 120_2. Further, in step S625, the arbitrator node 120_1 also records the corresponding state diagnostic code according to whether the processor 120_2 returns the access right within a preset time. In the case where the processor 120_2 is not granted with the access right of the shared device 110, as shown by step S630, the request is ended.

After determining that the processor which transmits the request for requesting the access right has the access right of the shared device 110, the arbitrator node 120_1 continuously monitors whether the processor which transmits said request returns the access right of the shared device 110 within the preset time. Further, the arbitrator node 120_1 records the corresponding state diagnostic code according to whether the access right of the shared device 110 is returned within the preset time.

By the connection state diagnosis as described above, the arbitrator end, the processor end, the device end may be fully monitored, so that the replacement of the arbitrator other contingency measures may be performed before problems occur. Further, the arbitrator end can archive the state diagnostic codes of all the processors once in a while, re-calculate the priority score of each of the processors to re-generate the priority sequences, and update the re-generated priority sequence to each of the processors.

When the priority score corresponding to the current arbitrator node exceeds a preset threshold, a qualification of the current arbitrator node is canceled and the processor having the lowest priority score is used to serve as the new arbitrator node.

Other than the general conditions (e.g., the arbitrator node is shut down, or the heartbeat packet is lost) which requires the replacement of the arbitrator node, the arbitrator node may be replaced in advance before detecting that the arbitrator node loses its arbitration capacity. That is an important factor for a reliable system. Therefore, when the priority score of the arbitrator node in the priority table does not meet the standards compliant, the arbitrator replacement mechanism is activated so that the processor having the lowest priority score in the priority table is used as the new arbitrator node.

Figure 7:
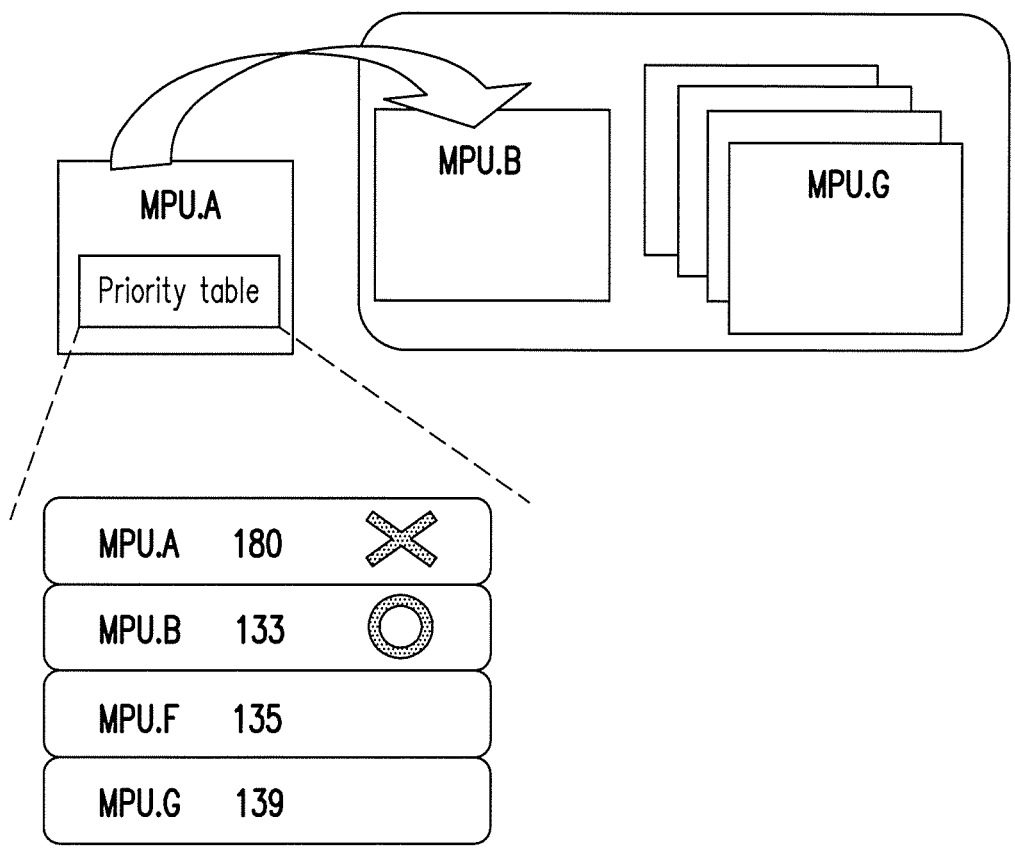
FIG. 7 is a schematic diagram of an arbitrator replacement mechanism according to an embodiment of the invention.

FIG. 7 is a schematic diagram of an arbitrator replacement mechanism according to an embodiment of the invention. In this embodiment, it is assumed that the original arbitrator node is "MPU.A" and the preset threshold is 150. As shown by FIG. 7, the priority score of the original arbitrator node MPU.A already exceeds 150. Therefore, the arbitrator node MPU.A activates the arbitrator replacement mechanism, so that the processor MPU.B having the lowest priority score in the priority table is used to serve as the new arbitrator node.

Moreover, the priority score may also serve as a reference for activating an error notification mechanism. For example, the error notification mechanism is activated when the priority score of the processor or the shared device exceeds a preset standard threshold, so as to stop the transmission with the shared device or stop use the processor until problems are solved by the user or the maintenance personnel.

After it is taken over by the new arbitrator node, subsequent calculation for the priority score includes the following methods. Hereinafter, the description is provided below based on an example in which the processor MPU.A being the previous arbitrator node while the processor MPU.B serves as the new arbitrator node. However, the disclosure is not limited thereto.

The new arbitrator node MPU.B can reset the priority table. That is to say, the priority scores obtained by the previous arbitrator node MPU.A is no longer used, and the priority score of each of the other processors are re-calculated instead.

In addition, the new arbitrator node MPU.B can continue to use the priority table established by the previous arbitrator node MPU.A, use the priority score of each of the processors obtained by the previous arbitrator node MPU.A to serve as the initial weight, and then calculate the priority score in the subsequent process. In other words, the new arbitrator node MPU.B can set the priority score of each of the processors obtained by calculating through the previous arbitrator node MPU.A as the initial weight. Thereafter, the equation priority_W=ini_W×(1+state_total_W) is used to obtain the state diagnostic code to thereby update the priority score. The purpose of setting the previously obtained priority score as the initial weight aims to achieve control the use state of the previous system architecture.

If the priority score of one of the processors (e.g., the processor MPU.G) continues to increase and eventually exceeds the pre-defined threshold (e.g., 1000), the arbitrator node MPU. B can transmit a notification message to inform the user the same, so that the user can attempt to solve the problems of the processor MPU.G. After the problems are solved, the processor MPU.G in which problems are solved can transmit a reset command (e.g., the state diagnostic code included by the reset command is "0x20") to the arbitrator node MPU.B so that the arbitrator node MPU.B can clear the existing priority score of the processor MPU.G and set the initial weight by the identification information of the processor MPU.G (referring to description for step S305) in order to re-calculate the priority score.

Yet, when the entire system is to be maintained, the user can directly issue a clear command (e.g., the state diagnostic code included by the clear command is "0x21") for the arbitrator node MPU.B after repairing a part of the processors and the shared devices, so as to clear the priority table and the diagnostic code table.

Further, the corresponding state diagnostic codes may be respectively set in response to the two conditions of granting access to the shared device and not granting access to the shared device. For example, the state diagnostic code corresponding to the condition of granting the access right of the shared device is "0x06", whereas the state diagnostic code corresponding to the condition of not granting the access right of the shared device is "0x07". When determining to grant the processor that transmitted the request to use the shared device, the arbitrator node can record "0x06" into the field corresponding to that processor in the diagnostic code table and otherwise record "0x07" when determining not to grant the access.

In addition, a starvation phenomenon may be solved by further fine-tuning the state weights corresponding to the state diagnostic codes "0x06" and "0x07". For example, the state weight of the state diagnostic code "0x06" is set as 0.01, and the state weight of the state diagnostic code "0x07" is set as 0. Accordingly, when calculating the priority score, the arbitrator node can increase the priority score of the processor that obtained the access right of the shared device multiple times based on the state weight of the state diagnostic code "0x06". This is because there are more "0x06" recorded in the processor used to successfully obtain the access right of the shared device, such that the priority score thereof is higher since a sum of the state weights becomes higher when calculating the priority score. Accordingly, the other processors are also able to obtain the access right of the shared device.

Furthermore, before obtaining the state diagnostic information of each of the processors obtained through the connection state diagnosis, when the arbitrator node simultaneously receives the request for requesting the access right of the shared device transmitted by each of two or more of the processors, the access right of the shared device is determined by the initial weight of each of the processors.

In summary, by utilizing the transmission state of each of the processors to the arbitrator node and the shared device together with the characteristic of each of the processors to determine the priority sequence, the incomplete data caused by the race condition due to accessing by multiple processors may be prevented and the problems related to the access efficiency and priority issue in the replacement may also be solved. A proper priority sequence may be obtained by fine-tuning the determination mechanism for the priority together with the connection diagnostic mechanism based on the different processors. With use of the priority sequence as reference for determination in various mechanisms for conflict, problems and replacement, the arbitrator end may accomplish a truly fair and suitable resource allocation. Because the state diagnostic code is obtained by performing the connection state diagnosis on each transmission, the transmission state between each of the processors and the shared device may be monitored. During the maintenance, the maintain personnel may find the problem by referring to the state diagnostic code so as to facilitate the troubleshooting.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for using a shared device, wherein the shared device is provided for a plurality of processors to use, one of the processors serves as an arbitrator node, and the method for using the shared device comprises:
   establishing a priority sequence by the arbitrator node by steps comprising:
   setting an initial weight of each of the processors based on identification information of each of the processors;
   obtaining state diagnostic information of each of the processors, wherein the state diagnostic information indicates a transmission state of each of the processors to the arbitrator node and the shared device, the state diagnostic information comprises one or more state diagnostic codes, and each of the state diagnostic codes is corresponding to a state weight; and
   calculating a priority score for each of the processors to establish the priority sequence based on the initial weight corresponding to each of the processors and the one or more state weights corresponding to the one or more state diagnostic codes included by each of the processors; and
   when the arbitrator node simultaneously receives a request for requesting an access right of the shared device transmitted by each of two or more of the processors, determining one of the processors as having the access right of the shared device based on the priority sequence.

2. The method for using the shared device of claim 1, wherein the priority score of each of the processors is calculated according an equation below:

$$priority\_W = ini\_W \times (1 + state\_total\_W);$$

wherein priority_W represents the priority score of one of the processors, ini_W represents the initial weight of one of the processors, and state_total_W represents a sum of the one or more state weights corresponding to the one or more state diagnostic codes included by one of the processors,
   wherein the priority score being lower indicates that the priority sequence of the corresponding one of the processors is higher; and the priority score being higher indicates that the priority sequence of the corresponding one of the processors is lower.

3. The method for using the shared device of claim 1, wherein when one of the processors intends to use the shared device, the method for using the shared device comprises:
   transmitting the request for requesting the access right of the shared device to the arbitrator node and recording the corresponding state diagnostic code based on a response of the arbitrator node; and
   performing a data transmission with the shared device when the access right of the shared device is obtained and recording the state diagnostic code corresponding to the shared device based on a transmission result.

4. The method for using the shared device of claim 1, wherein when the arbitrator node receives the request for requesting the access right of the shared device from one of the processors, the method for using the shared device comprises:
   analyzing the request to obtain the state diagnostic code corresponding to the request and recording the state diagnostic code corresponding to the request;
   transmitting a request result to the processor that transmitted the request, wherein the request result records the state diagnostic code corresponding to the request;
   after determining the processor that transmitted the request as having the access right of the shared device, monitoring whether the processor that transmitted the request returns the access right of the shared device within a preset time; and
   recording the corresponding state diagnostic code according to whether the processor returns the access right of the shared device within the preset time.

5. The method for using the shared device of claim 1, further comprising:
   regularly receiving the state diagnostic information from each of the processors by the arbitrator node.

6. The method for using the shared device of claim 1, further comprising:
   canceling a qualification of the current arbitrator node and using one of the processors having the lowest priority score to serve as a new arbitrator node when the priority score corresponding to the current arbitrator node exceeds a threshold.

7. The method for using the shared device of claim 6, wherein after the step of using the one of the processor having the lowest priority score to serve as the new arbitrator node, the method for using the shared device further comprises:
   setting the priority score of each of the processors obtained by calculating through the previous arbitrator node as the initial weight of each of the processors by the new arbitrator node.

8. The method for using the shared device of claim 1, further comprising:
   before obtaining the state diagnostic information of the processors to establish the priority sequence, when the arbitrator node simultaneously receives the request for requesting the access right of the shared device transmitted by each of two or more of the processors, determining one of the processors as having the access right of the shared device by the initial weight of each of the processors.

9. The method for using the shared device of claim 1, wherein the identification information comprises at least one of a firmware version, a processor number, a processor internal setting, a number of processor cores, a processor clock, a processor type and a processor usage.

10. The method for using the shared device of claim 1, further comprising:
   transmitting a plurality of inquiry messages to the processors by the arbitrator node to obtain the identification information from each of the processors.

11. The method for using the shared device of claim 1, further comprising:
   synchronizing the priority sequence to each of the processors by the arbitrator node.

12. A resource sharing system, comprising:
   a plurality of processors;
   a shared device, coupled to the processors and provided for the processors to use;
   wherein one of the processors serves as an arbitrator node;
   a priority sequence is established by the arbitrator node by steps comprising: setting an initial weight of each of the processors based on identification information of each of the processors; obtaining state diagnostic information of each of the processors, wherein the state diagnostic information indicates a transmission state of each of the processors to the arbitrator node and the shared device, the state diagnostic information comprises one or more state diagnostic codes, and each of the state diagnostic codes is corresponding to a state weight; and calculating a priority score for each of the processors to establish the priority sequence based on the initial weight corresponding to each of the processors and the one or more state weights corresponding to the one or more state diagnostic codes included by each of the processors; and
   when the arbitrator node simultaneously receives a request for requesting an access right of the shared device transmitted by each of two or more of the processors, determining one of the processors as having the access right of the shared device based on the priority sequence.

13. The resource sharing system of claim 12, wherein the arbitrator node calculates the priority score of each of the processors according an equation below:

priority_$W$=ini_$W$×(1+state_total_$W$);

wherein priority_$W$ represents the priority score of one of the processors, ini_$W$ represents the initial weight of one of the processors, and state_total_$W$ represents a sum of the one or more state weights corresponding to the one or more state diagnostic codes included by one of the processors,
   wherein the priority score being lower indicates that the priority sequence of the corresponding one of the processors is higher; and the priority score being higher indicates that the priority sequence of the corresponding one of the processors is lower.

14. The resource sharing system of claim 12, wherein when one of the processors intends to use the shared device, the processor transmits the request for requesting the access right of the shared device to the arbitrator node and records the corresponding state diagnostic code based on a response of the arbitrator node; and the processor performs a data transmission with the shared device when the access right of the shared device is obtained and records the state diagnostic code corresponding to the shared device based on a transmission result.

15. The resource sharing system of claim 12, wherein when the arbitrator node receives the request for requesting the access right of the shared device from one of the processors, the arbitrator node performs steps of: analyzing the request to obtain the state diagnostic code corresponding to the request and recording the state diagnostic code corresponding to the request; transmitting a request result to the processor that transmitted the request, wherein the request result records the corresponding state diagnostic code; after determining the processor that transmitted the request as having the access right of the shared device, monitoring whether the processor that transmitted the request returns the access right of the shared device within a preset time; and recording the corresponding state diagnostic code according to whether the processor returns the access right of the shared device within the preset time.

16. The resource sharing system of claim 12, wherein the arbitrator node regularly receives the state diagnostic information from each of the processors.

17. The resource sharing system of claim 12, wherein a qualification of the current arbitrator node is canceled and one of the processors having the lowest priority score is used to serve as a new arbitrator node when the priority score corresponding to the current arbitrator node exceeds a threshold.

18. The resource sharing system of claim 17, wherein the new arbitrator node sets the priority score of each of the processors obtained by calculating through the previous arbitrator node as the initial weight of each of the processors.

19. The resource sharing system of claim 12, wherein before obtaining the state diagnostic information of the processors to establish the priority sequence, when the arbitrator node simultaneously receives the request for requesting the access right of the shared device transmitted by each of two or more of the processors, one of the processors having the access right of the shared device is determined by the initial weight of each of the processors.

20. The resource sharing system of claim 12, wherein the identification information comprises at least one of a firmware version, a processor number, a processor internal setting, a number of processor cores, a processor clock, a processor type and a processor usage.

21. The resource sharing system of claim 12, wherein the arbitrator node transmits a plurality of inquiry messages to the processors to obtain the identification information from each of the processors.

22. The resource sharing system of claim 12, wherein the arbitrator node synchronizes the priority sequence to each of the processors.

\* \* \* \* \*